United States Patent
Tabet et al.

(10) Patent No.: US 9,554,359 B2
(45) Date of Patent: Jan. 24, 2017

(54) DYNAMIC ANTENNA TUNER SETTING FOR CARRIER AGGREGATION SCENARIOS

(71) Applicant: Apple Inc., Cupertino, CA (US)

(72) Inventors: Tarik Tabet, Los Gatos, CA (US); Navid Damji, Cupertino, CA (US); Ming Hu, Sunnyvale, CA (US); Christian W. Mucke, Sunnyvale, CA (US); Vinay R. Majjigi, Sunnyvale, CA (US); Syed A. Mujtaba, Santa Clara, CA (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 295 days.

(21) Appl. No.: 14/175,502

(22) Filed: Feb. 7, 2014

(65) Prior Publication Data
US 2015/0230206 A1    Aug. 13, 2015

(51) Int. Cl.
*H04W 4/00*      (2009.01)
*H04W 72/02*     (2009.01)
(Continued)

(52) U.S. Cl.
CPC ............ *H04W 72/02* (2013.01); *H04L 5/0039* (2013.01); *H04L 5/0041* (2013.01); *H04L 25/00* (2013.01);
(Continued)

(58) Field of Classification Search
USPC ................ 370/230, 252, 311, 328, 329, 339, 341,370/343
See application file for complete search history.

(56) References Cited

U.S. PATENT DOCUMENTS

| 8,526,388 B1* | 9/2013 | Kaukovuori ........ H04W 72/082 370/329 |
| 2011/0081936 A1* | 4/2011 | Haim .................. H04W 52/367 455/522 |

(Continued)

FOREIGN PATENT DOCUMENTS

| JP | 2011091805 A | 5/2011 |
| JP | 2013500630 A | 1/2013 |
| JP | 2013520098 A | 5/2013 |

OTHER PUBLICATIONS

Japanese Patent Application No. 2015-022281—First Office Action dated Feb. 5, 2016.

*Primary Examiner* — Kwang B Yao
*Assistant Examiner* — Nguyen Ngo
(74) *Attorney, Agent, or Firm* — Downey Brand LLP

(57) ABSTRACT

Apparatus and methods for dynamically adjusting radio frequency circuitry in a wireless communication device are disclosed. The wireless communication device can receive downlink communication using carrier aggregation through a primary component carrier and a secondary component carrier. When carrier aggregation is not enabled, the wireless communication device adjusts the radio frequency circuitry based on default values. When carrier aggregation is enabled, the wireless communication device evaluates radio frequency conditions for the primary and secondary component carriers and adjusts the radio frequency circuitry based on whether uplink and/or downlink communication is power constrained. When uplink communication is power constrained, the wireless communication device adjusts the radio frequency circuitry for optimal performance via the primary component carrier, and when uplink communication is not power constrained, the wireless communication device adjusts the radio frequency circuitry for optimal (Continued)

performance via the combination of the primary and secondary component carriers used for carrier aggregation.

15 Claims, 10 Drawing Sheets

(51) Int. Cl.
*H04W 74/02* (2009.01)
*H04L 25/00* (2006.01)
*H04W 52/00* (2009.01)
*H04W 52/34* (2009.01)
*H04L 5/00* (2006.01)
*H04W 72/12* (2009.01)
*H04W 88/06* (2009.01)
*H04W 52/24* (2009.01)
*H04W 52/36* (2009.01)
*H04W 52/42* (2009.01)

(52) U.S. Cl.
CPC .......... *H04W 52/00* (2013.01); *H04W 52/346* (2013.01); *H04W 74/02* (2013.01); *H04W 52/245* (2013.01); *H04W 52/365* (2013.01); *H04W 52/42* (2013.01); *H04W 72/1215* (2013.01); *H04W 88/06* (2013.01)

(56) References Cited

U.S. PATENT DOCUMENTS

| | | | |
|---|---|---|---|
| 2011/0092174 A1 | 4/2011 | Choi et al. | |
| 2011/0176498 A1* | 7/2011 | Montojo | H04W 72/048 370/329 |
| 2011/0199921 A1 | 8/2011 | Damnjanovic et al. | |
| 2012/0224552 A1* | 9/2012 | Feuersanger | H04L 5/0007 370/329 |
| 2013/0010619 A1* | 1/2013 | Fong | H04W 74/002 370/252 |
| 2013/0201834 A1* | 8/2013 | Klingenbrunn | H04W 28/12 370/236 |
| 2013/0324182 A1* | 12/2013 | Deng | H04W 52/281 455/522 |
| 2014/0126530 A1* | 5/2014 | Siomina | H04W 52/146 370/330 |
| 2015/0172987 A1* | 6/2015 | Balakrishnan | H04W 36/24 370/331 |
| 2015/0215943 A1* | 7/2015 | Vajapeyam | H04W 72/0473 370/329 |
| 2015/0326287 A1* | 11/2015 | Kazmi | H04W 52/0216 375/267 |

* cited by examiner

DYNAMIC ANTENNA TUNER SETTING FOR CARRIER AGGREGATION SCENARIOS

FIELD

The described embodiments generally relate to wireless communications, and more particularly, to procedures for dynamically tuning antenna settings for carrier aggregation scenarios.

BACKGROUND

Fourth generation (4G) cellular networks employing newer radio access technology systems that implement the $3^{rd}$ Generation Partnership Project (3GPP) Long Term Evolution (LTE) and LTE Advanced (LTE-A) standards are rapidly being developed and deployed within the United States and abroad. The LTE-A standard includes modes for aggregation of multiple component carriers (CCs) to provide for meeting the bandwidth requirements of multi-carrier systems that cumulatively achieve data rates not possible by predecessor LTE versions. Wireless communication devices include configurable radio frequency (RF) circuitry that can transmit and/or receive radio frequency communications using multiple component carriers in multiple radio frequency bands. Fixed settings for the configurable radio frequency circuitry, e.g., adjusted to maximize communication using only a primary component carrier can provide less than optimal performance when carrier aggregation via multiple component carriers is used.

As such, there exists a need for solutions that adapt settings of the configurable radio frequency circuitry in wireless communication devices based on monitoring radio frequency conditions including performance metrics to provide for both downlink communication performance and for uplink communication performance. In this regard, it would be beneficial to dynamically tune radio frequency circuitry coupled to one or more antennas in a wireless communication device operating within LTE-A networks employing carrier aggregation.

SUMMARY

Apparatus and methods for dynamically adjusting radio frequency circuitry of a radio frequency front end of a wireless communication device is described. The wireless communication device receives downlink communication from a wireless network, which in some embodiments operates in accordance with a Long Term Evolution (LTE) or Long Term Evolution Advanced (LTE-A) wireless communication protocol, using carrier aggregation through multiple component carriers. In a representative embodiment, carrier aggregation uses a primary component carrier and a secondary component carrier, which can be contiguous or non-contiguous within a common radio frequency band or can be non-contiguous across two separate radio frequency bands. When carrier aggregation is not enabled, the wireless communication device adjusts radio frequency circuitry based on a set of default setting values, e.g., optimized for communication in a downlink direction, an uplink direction, or in both directions when operating in the absence of carrier aggregation. When carrier aggregation is enabled, the wireless communication device evaluates radio frequency conditions for the primary component carrier and for the secondary component carrier used for carrier aggregation and adjusts the radio frequency circuitry based on whether uplink communication is power constrained, whether downlink communication is power constrained, or both uplink and downlink communication is power constrained. The wireless communication device adjusts the radio frequency circuitry by matching a set of radio frequency component blocks in the radio frequency front end of the wireless communication device to a set of one or more antennas to maximize received or transmitted power transfer via the primary component carrier or to maximize received power transfer via both the primary component carrier and the secondary component carrier in combination. In some embodiments, the wireless communication device adjusts the radio frequency circuitry to maximize a downlink data rate, a downlink data performance measure, a downlink signal strength or signal quality, an uplink data rate, an uplink data performance measure, or a combination of these. When uplink communication is power constrained, the wireless communication device adjusts the radio frequency circuitry for optimal performance via the primary component carrier, and when uplink communication is not power constrained, the wireless communication device adjusts the radio frequency circuitry for optimal performance via the combination of the primary and secondary component carriers used for carrier aggregation.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

DETAILED DESCRIPTION

Figure 1:
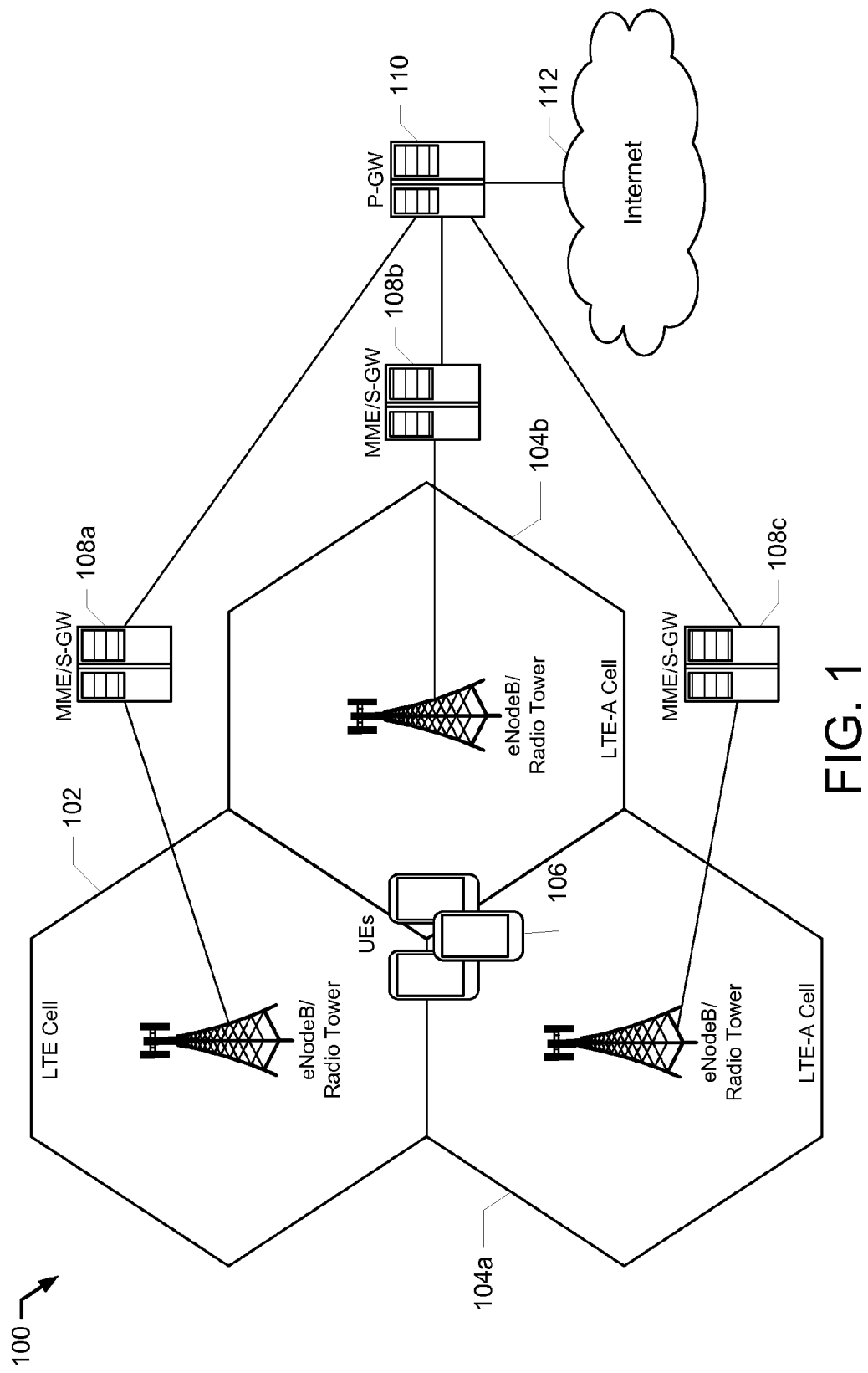
FIG. 1 illustrates a wireless communication network including Long Term Evolution (LTE) and LTE Advanced (LTE-A) network cells supporting multiple user equipment devices (UEs), in accordance with various embodiments of the disclosure.

Representative examples of dynamically selecting antenna tuner settings in a mobile wireless device based on a combination of downlink operating conditions, uplink operating conditions, or both are provided herein. These examples are provided to add context to, and to aid in the understanding of, the subject matter of this disclosure. It should be apparent that the present disclosure may be practiced with or without some of the specific details described herein. Further, various modifications and/or alterations can be made to the subject matter described herein, and illustrated in the corresponding figures, to achieve similar advantages and results, without departing from the spirit and scope of the disclosure.

References are made in this section to the accompanying drawings, which form a part of the disclosure and in which are shown, by way of illustration, various implementations corresponding to the described embodiments herein. Although the embodiments of this disclosure are described in sufficient detail to enable one having ordinary skill in the art to practice the described implementations, it should be understood that these examples are not to be construed as being overly-limiting or all-inclusive.

In accordance with various embodiments described herein, the terms "wireless communication device," "wireless device," "mobile device," "mobile station," and "user equipment" (UE) may be used interchangeably herein to describe one, or any number of, common consumer electronic device(s) that may be capable of performing procedures associated various embodiments the disclosure. In accordance with various implementations, any one of these consumer electronic devices may relate to: a cellular phone or a smart phone, a tablet computer, a laptop computer or a netbook computer, a media player device, an electronic book device, a MiFi® device, as well as any other type of electronic computing device having fourth generation (4G) LTE and LTE Advanced (LTE-A) communication capabilities. In various embodiments, these capabilities may allow a respective UE to communicate within various 4G network cells that can employ any type of LTE-based radio access technology (RAT) supporting carrier aggregation.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE or LTE-A networks offering faster data rate throughput, as compared to other 3G legacy networks offering lower data rate throughputs. For instance, in some implementations, a 4G compliant UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Wireless communication devices that communicate in accordance with 3GPP LTE and/or LTE-A wireless communication protocols can use carrier aggregation to provide for increased throughput, e.g., in a downlink direction from multiple cells of a wireless network. A primary component carrier, which can be associated with a first cell (primary cell) of the wireless network, can be used for a combination of downlink communication from the wireless network to the wireless communication device and uplink communication from the wireless communication device to the wireless network. A secondary component carrier, which can be associated with a second cell (secondary cell) of the wireless network, can be used for downlink communication. The aggregate data rate achievable through carrier aggregation with multiple component carriers can surpass data rates achievable by using only a single component carrier. Uplink communication, however, can be constrained to use the primary component carrier, and each component carrier can be centered at different radio frequency values in a single radio frequency band or across two different radio frequency bands. Radio frequency circuitry in the wireless communication device can be adjusted, or "tuned," to match radio frequency transfer characteristics of one or more antennas, to which the radio frequency circuitry is coupled, to maximize power transfer through a range of radio frequencies. A "static" setting can provide for maximizing power transfer through the primary component carrier, but may result in sub-optimal power transfer through the secondary component carrier. A "dynamic" setting can provide for adjusting the radio frequency circuitry to maximize power transfer in a downlink direction, in an uplink direction, or in both downlink and uplink directions based on radio frequency operating conditions. For example, the wireless communication device can determine whether uplink communication, which can use the primary component carrier, is "power limited" or otherwise "constrained" such that uplink performance can be compromised or less than desired or less than required for proper operation. When uplink communication is not performance limited, the wireless communication device can adjust the radio frequency circuitry to maximize power transfer in a downlink direction when using multiple component carriers for carrier aggregation. When uplink communication is performance limited (or equivalently "power limited" or "constrained"), the wireless communication device can adjust the radio frequency circuitry to maximize power transfer in the downlink direction and/or in the uplink direction through the primary component carrier. The wireless communication device can use one or more performance metrics that monitor radio frequency conditions, signal quality, data communication performance, link stability, or the like, to determine whether uplink and/or downlink communication is power limited, constrained, or performance limited.

FIG. 1 depicts a wireless communication system 100 that is compliant with a 3GPP Evolved Universal Terrestrial Radio Access (E-UTRA) air interface, and includes, but is not limited to including, one LTE network cell 102 and two LTE-A network cells 104*a-b*, respectively having enhanced NodeB (eNodeB) base stations (e.g., depicted as radio towers) that can communication between and amongst each other via an LTE-X2 interface. Further, the E-UTRA compliant communication system 100 can include any number of mobility management entities (MMEs) 108*a-c*, serving gateways (S-GWs) 108*a-c*, PDN gateways (P-GWs) 110, etc., which, as part of an evolved packet core (EPC), can communicate with any of the LTE and LTE-A cell eNodeBs, 102 and 104*a-b*, via an LTE-S1 interface. Additionally, the E-UTRA communication system 100 can include any number of UEs 106 that may receive wireless communications service via one or more of the eNodeBs of the LTE and LTE-A cells, 102 and 104*a-b*, at any particular time. By way of example, a UE 106 may be located within one or more LTE-A cell(s) 104*a-b*. While not explicitly illustrated in FIG. 1, LTE and LTE-A cells can overlap at least partially in geographic area covered by each cell.

In various embodiments, any of the MMEs 108*a-c* and/or any of the eNodeB base stations of the LTE-A cells 104*a-b*, which are capable of supporting carrier aggregation, can be configured to communicate control-plane data to any of the UEs 106 in the DL; Alternatively, any of the UEs 106 may be capable of communicating control-plane data via any of the LTE-A cells 104*a-b* in the UL. In this regard, it should be understood that the MMEs 108*a-b* can perform Non-Access Stratum (NAS) control-plane signaling between the EPC and the UE 106 via the eNodeB over the radio access network (RAN) portion of the network. In some scenarios, NAS signaling can include, but is not limited to including, procedures for establishing and releasing radio bearer connections for user equipment (UE), affecting UE transitions from idle mode to connected mode (and vice versa) by generating corresponding paging messages, implementing various communication security features, etc.

Further, the eNodeB base stations of the LTE-A cells 104*a-b* can be configured to perform various radio resource control (RRC) control-plane signaling procedures, including, but not limited to including, system information broadcasting, transmitting paging messages emanating from MMEs, RRC parameter configuration for UEs, network cell selection and reselection procedures, measurement and reporting configuration for UEs, etc. In various implementations, RRC control plane signaling may be performed in conjunction with one or more of the following LTE protocol entities or layers: the packet data convergence protocol (PDCP), the radio link control (RLC) layer, the medium access control (MAC) layer, and the physical (PHY) layer. It should be understood that control-plane data and user-plane data can be multiplexed within the MAC layer and communicated to an intended recipient via the PHY layer, in the downlink (DL) or in the uplink (UL), e.g., during the same transmission time interval (TTI).

Figure 2:
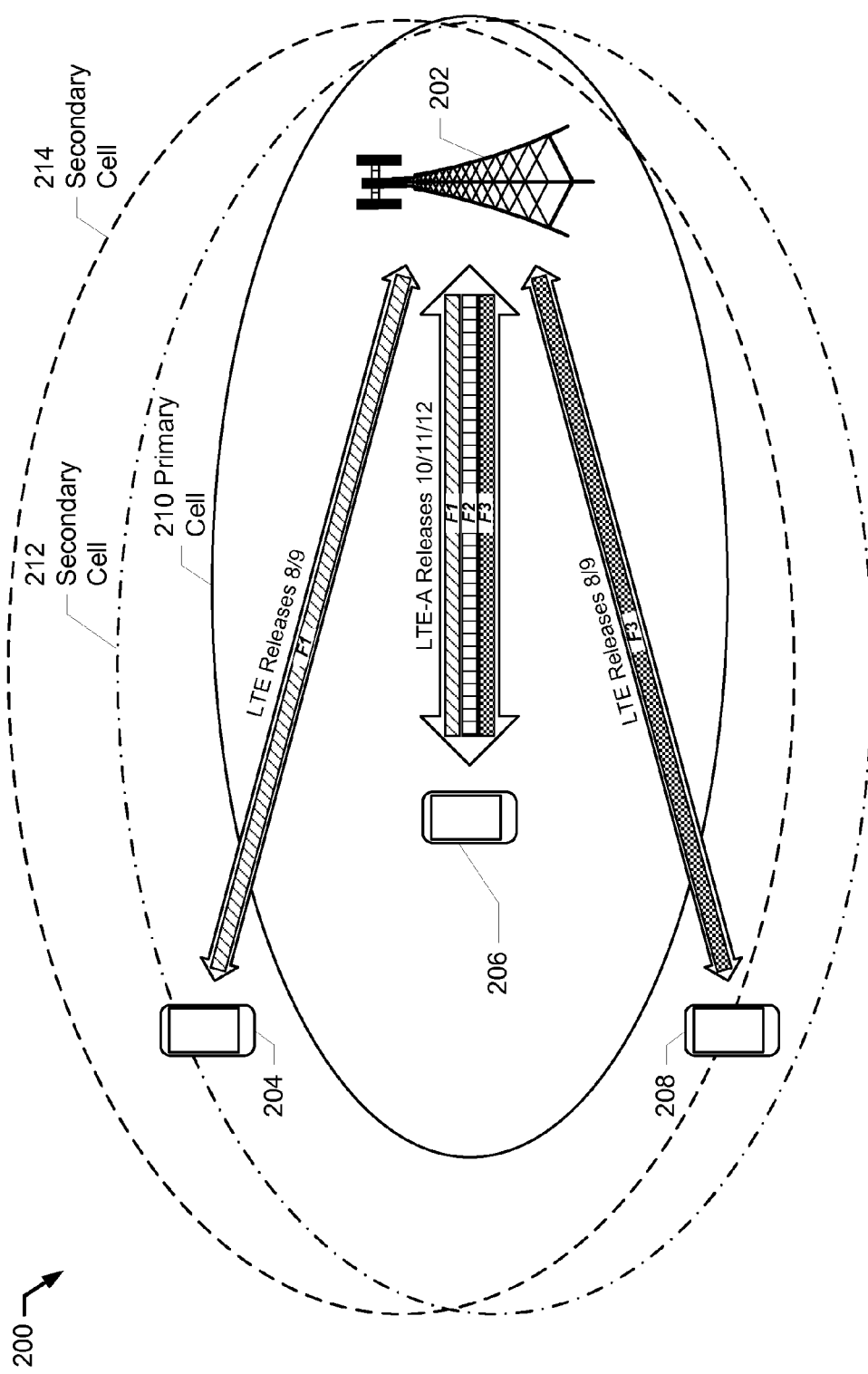
FIG. 2 illustrates a wireless communication network diagram depicting an LTE-A compliant user equipment (UE) in communication with a primary carrier cell and two secondary carrier cells in a carrier aggregation scenario, in accordance with various implementations of the disclosure.

FIG. 2 illustrates a wireless communication network diagram 200 depicting an LTE-A compliant UE 206 that is in communication with a primary cell 210 and with two secondary cells 212 and 214, in a carrier aggregation scenario. By way of example, and with reference to 3GPP LTE-A Releases 10, 11, and 12, the LTE-A compliant UE 206 can communicate control-plane data with the eNodeB base station 202 (e.g., in the DL or the UL) that can have multiple antennae for providing radio coverage via three distinct radio frequency resources, F1, F2, and F3, which can be individual component carriers (CCs) for communication that can be provided to UE 206 in aggregate, e.g., to increase communication bandwidth and/or throughput. From the perspective of the LTE-A compliant UE 206, the CC radio frequency resource F1 can be associated with the primary cell 210, the CC radio frequency resource F2 can be associated with the secondary cell 212, and the CC radio frequency resource F3 can be associated with the secondary cell 214. Alternative carrier aggregation representations for a frequency resource scenario are described further herein for FIGS. 3A, 3B and 3C.

The communication network diagram 200 also depicts two LTE compliant UEs, 204 and 208, with reference to 3GPP LTE Releases 8 and 9, which are not capable of communicating using carrier aggregation. By way of example, the LTE compliant UE 204 can communicate control-plane data with the eNodeB base station 202 (in the DL or the UL) via a single frequency resource F1, and the LTE compliant UE 208 may be configured to communicate control-plane data with the eNodeB base station 202 (in the DL or the UL) via a single frequency resource F3. In the single carrier scenario, LTE compliant UEs, 204 and 208, employ individual standard-designated system bandwidths that limit achievable data rate throughput to roughly 300 Mbits/sec. in the DL, and roughly 75 Mbits/sec. in the UL (real world implementations may vary).

Figure 3A:
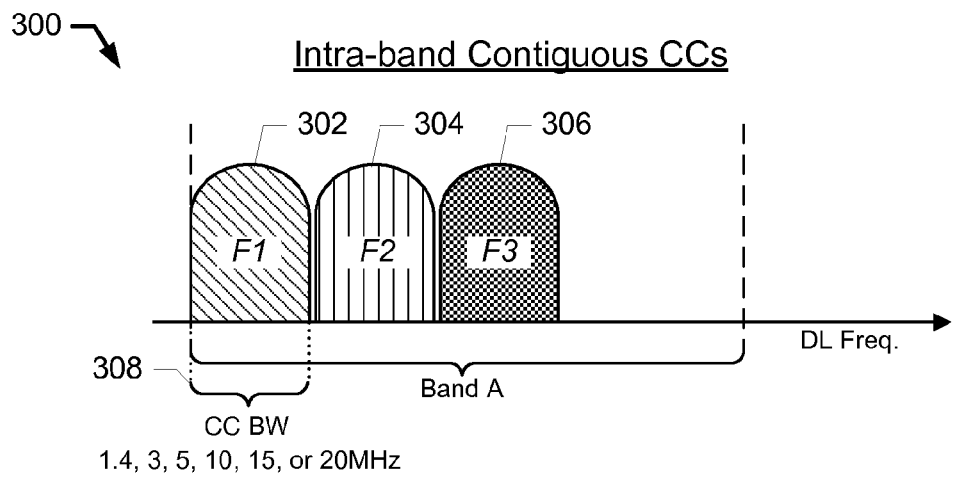
FIGS. 3A, 3B, and 3C illustrate three distinct carrier aggregation representations that depict two intra-band component carrier (CC) frequency resource diagrams and one inter-band CC frequency resource diagram, in accordance with various embodiments of the disclosure.
Figure 3B:
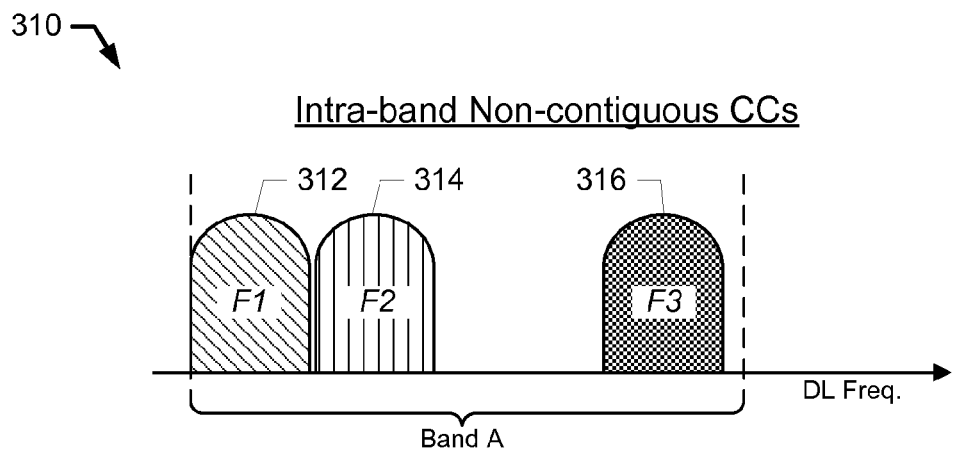
Figure 3C:
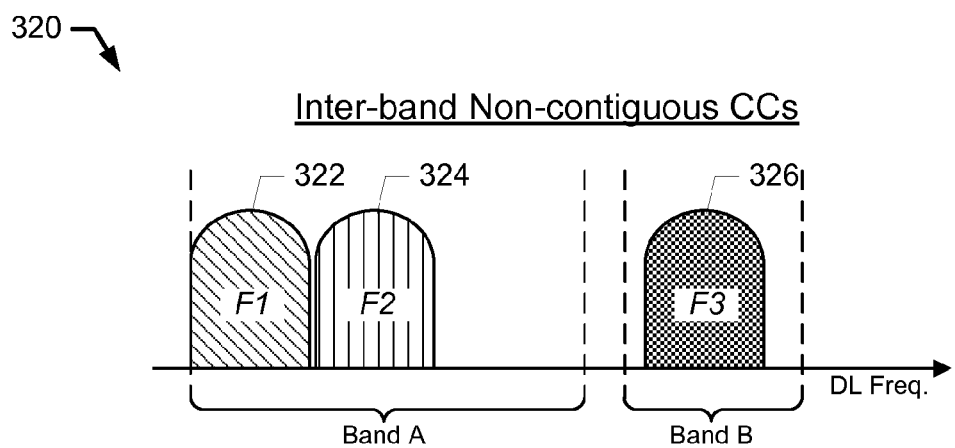

FIGS. 3A, 3B, and 3C show three distinct carrier aggregation representations depicting two intra-band CC frequency resource diagrams, 300 and 310, and one inter-band CC frequency resource diagram 320, in accordance with various embodiments. As is generally understood, in 3GPP LTE and LTE-A, an individual CC is limited to communicating at various designated system bandwidths 308 ranging from 1.4 MHz up to 20 MHz. As such, the cumulative DL data rate throughput achievable in carrier aggregation scenarios can increase the single carrier data-rate throughput of roughly 300 Mbits/sec. by some multiplier value, relating to the number of CCs employed (up to 5 CCs in LTE-A).

FIG. 3A illustrates a carrier aggregation representation depicting an intra-band contiguous CC frequency resource diagram 300, where each aggregated CC, 302, 304, and 306, is associated with its own distinct frequency resource, F1, F2, or F3, within the same service provider designated DL frequency band, Band A. In the intra-band contiguous CC scenario, the three frequency resources, F1, F2, and F3, are sequential CC frequencies in the frequency domain. FIG. 3B illustrates a carrier aggregation representation depicting an intra-band non-contiguous CC frequency resource diagram 310, where each aggregated CC, 312, 314, and 316, is associated with its own distinct frequency resource, F1, F2, or F3, within a single DL frequency band, Band A. However, in the intra-band non-contiguous CC scenario 310, the three frequency resources, F1, F2, and F3, can be CC frequencies that are respectively separated by one or more intervening frequencies in the frequency domain, within Band A.

FIG. 3C illustrates a carrier aggregation representation depicting an inter-band non-contiguous CC frequency resource diagram 320, where each aggregated CC, 322, 324, and 326, is associated with its own distinct frequency resource, F1, F2, or F3, spread across two service provider designated DL frequency bands, Band A and Band B. In the inter-band non-contiguous CC scenario, the frequency resources, F1 and F2, of Band A can be CC frequencies that are separated from the frequency resource F3 of Band B in the frequency domain. For reference, 3GPP LTE-A Release 10 specifies carrier aggregation for LTE, while LTE-A Releases 11 and 12 describe various carrier aggregation enhancements including various inter-band CC band pairings. It should be understood that telecommunications service providers generally operate using both similar and dissimilar licensed LTE frequency spectrum bands. For example, within the United States, Verizon's® LTE networks operate in the 700 and 1700/2100 Mhz frequency spectra using Bands 13 and 4, whereas AT&T's® LTE networks operate in the 700, 1700/2100, and 2300 MHz frequency spectra using Bands 17, 4, and 30.

For telecommunication networks employing LTE-A, interoperability with predecessor LTE versions can require LTE-A CCs to employ a system bandwidth equivalent to earlier LTE version counterparts. As such, the peak single CC LTE-A system bandwidth can be capped at 20 MHz for inter-LTE RAT compatibility. However, in various carrier aggregation scenarios, an aggregate set of LTE-A CCs may be able to achieve cumulative bandwidths of up to 100 MHz (5 CCs×20 MHz, the maximum LTE standard system bandwidth) using one or more allocated LTE spectrum bands. Generally, UEs operating within LTE 102 and/or LTE-A 104a-b network cells employ operating bandwidths that mirror a serving cell(s) system bandwidth; this implementation ensures that sufficient radio resources are allocated to support different UE data type communications, having varying quality of service (QOS) requirements.

Figure 4:
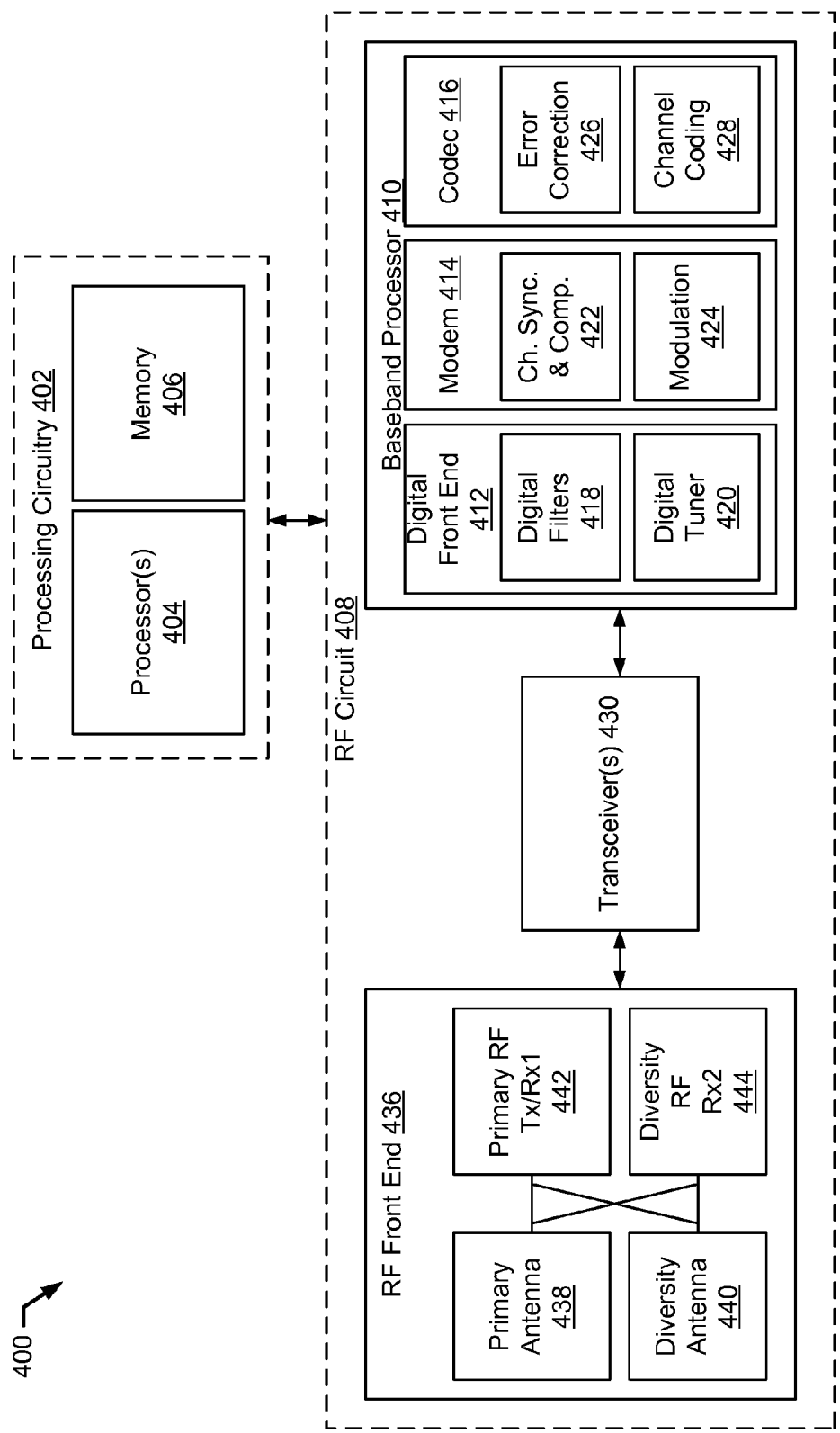
FIG. 4 illustrates a block diagram of a wireless communication device, in accordance with various embodiments of the disclosure.

FIG. 4 illustrates a block diagram 400 of components of a wireless communication device (e.g., a UE 106, an LTE compliant UE 204/208, or an LTE-A compliant UE 206) including processing circuitry 402 having one or more processor(s) 404 and a memory 406, and an RF circuit 408 having an baseband processor 410, one or more transceiver(s) 430 and a set of RF analog front end circuitry 436. The terms circuit, circuitry, component, and component block may be used interchangeably herein, in some embodiments, to refer to one or more operational units of a wireless communication device that process and/or operate on digital signals, analog signals, or digital data units used for wireless communication. For example, representative circuits include individual blocks or groupings of blocks as shown in FIG. 4 (or other groupings not explicitly shown) that can perform various functions that convert digital data units to transmitted radio frequency analog waveforms and/or convert received analog waveforms into digital data units including intermediate analog forms and intermediate digital forms. The RF circuit 408 can include an RF front end 436 that includes a set of one or more antennas, e.g., a primary antenna 438 and a diversity antenna 440, which can be interconnected with supporting RF circuitry, e.g., primary RF Tx/Rx1 442 circuitry and diversity RF Rx2 444 circuitry. The primary RF Tx/Rx1 442 circuitry can include filters and other analog components that can be "tuned" to match transmission and/or reception of analog signals via a corresponding antenna, e.g., primary antenna 438, diversity antenna 440, or both primary and diversity antennas 338/440. In some embodiments, the RF front end 436 can be controlled by signals (e.g., digital control signals) communicated from the baseband processor 410 and/or the processing circuitry 402, either directly from the processor(s) 402/410 or indirectly via another component in the RF circuit 408. The control signals can adjust the RF front end 436 dynamically, e.g., based on operating radio frequencies used by the primary component carrier and/or by (multiple) secondary component carriers, based on measured performance criteria, based on preconfigured tables, and/or based on calculable settings for adjustments of components to match the operating characteristics of the components of the RF front end 436 to transmit component carrier frequencies, receive component carrier frequencies, transmit via radio frequency bands, and/or receive via radio frequency bands. In some embodiments, the processing circuitry 402 and/or the baseband processor 410 monitors "real time" performance for received and/or transmitted RF signals to determine signal power levels, bit error rate (BER), block error rate (BLER), received signal code power (RSCP), received signal strength indication (RSSI), or other measures of signal power levels and/or signal quality levels, which can provide information about the radio frequency communication channel(s) used by the wireless communication device. The wireless communication device can adjust (tune) settings for the RF front end 436 to maximize throughput in the downlink direction, throughput in the uplink direction, or a combination of these, in some embodiments. The wireless communication device can match transmission characteristics and/or reception characteristics of the RF front end 436 circuitry to maximize power transfer of radio frequency signals at certain radio frequencies, (e.g., in accordance with one or more particular component carrier radio frequencies used for carrier aggregation), and/or within particular radio frequency bands used for carrier aggregation. In some embodiments, the baseband processor 410 includes circuitry, e.g., codec 416, error correction block 426, channel coding block 428, modem 414, modulation block 424, channel synchronization and compensation block 422, digital front end 412, digital filters 418, and digital tuner 420, which can include processing elements (hardware, firmware, software, and/or combinations of these) that monitor aspects of communication performance. The circuitry of the baseband processor 410 can determine, at least in part, settings for the RF front end 436 in response to measurements of received radio frequency signals and/or monitored bit/block error rates and/or received signaling/control messages.

The processing circuitry 402 and/or the baseband processor 410 can be configured to perform and/or control performance of one or more functionalities of the wireless communication device in accordance with various implementations. The processing circuitry 402 and/or processing circuitry in the RF circuit 408 can provide functionality for performing dynamic antenna tuner adjustment, e.g., by executing instructions in the processor 404 and/or in the baseband processor 410, in accordance with one or more embodiments. In this regard, the processing circuitry 402 and/or the baseband processor 410 can be configured to perform and/or control performance of one or more functionalities of the wireless communication device in accordance with various implementations, and thus can provide functionality for performing downlink (DL) and uplink (UL) communication performance adjustment, e.g., by adjusting dynamically settings for components in the RF front end 436, along with other communication procedures, in accordance with various embodiments. The processing circuitry 402 may further be configured to perform data processing, application execution, and/or other device functions according to one or more embodiments of the disclosure.

The wireless communication device, or portions or components thereof, such as the processing circuitry 402 and the baseband processor 410, can include one or more chipsets, which can respectively include any number of coupled microchips thereon. The processing circuitry 402, the baseband processor 410, and/or one or more other components of the wireless communication device may also be configured to implement functions associated with various RF front end 436 optimization procedures of the disclosure using multiple chipsets. In some scenarios, the wireless communication device may be associated with, or employed as, an LTE-A compliant UE 106 having one or more transceivers 430.

In various scenarios, the processing circuitry 402 of the wireless communication device may include one or more processor(s) 404/410 and a memory component 406. The processing circuitry 402 may be in communication with, or otherwise coupled to, the RF circuit 408 having an LTE compliant baseband processor 410, one or more wireless communication transceivers 430, and an RF front end 436. In some implementations, the RF circuit 408 may be configured to communicate using different RAT types. For instance, in some embodiments the RF circuit 408 may be configured to communicate using various RATs, including one or more LTE-A RATs.

In some embodiments, the processor(s) 404/410 may be configured in a variety of different forms. For example, the processor(s) 404/410 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 404 of the wireless communication device can be coupled to and/or configured in operative communication with each other, and these components may be collectively configured to perform dynamic adjustment of the RF front end 436 to improve transmit and/or receive performance of the wireless communication device as described further herein.

In some implementations, the processor(s) 404/410 can be configured to execute instructions that may be stored in the memory 406, or that can otherwise be accessible to the processor(s) 404/410 in some other device memory. As such, whether configured as, or in conjunction with, hardware or a combination of hardware and software, the processor(s) 404 of the processing circuitry 402 and/or the baseband processor 410 of the RF circuit 408 may be capable of performing operations according to various implementations described herein, when configured accordingly.

In various embodiments, the memory 406 of the processing circuitry 402 may include multiple memory devices that can be associated with any common volatile or non-volatile memory type. In some scenarios, the memory 406 may be associated with a non-transitory computer-readable storage medium that can store various computer program instructions, which may be executed by the processor(s) 404 during normal program executions. In this regard, the memory 406 can be configured to store information, data, applications, instructions, or the like, for enabling the wireless communication device to carry out various functions in accordance with one or more embodiments of the disclosure. In some implementations, the memory 406 may be in communication with, and/or otherwise coupled to, the processor(s) 404 of the processing circuitry 402, as well as one or more system buses for passing information between and amongst the different device components of the wireless communication device. In some embodiments, additional memory (not shown) can be included in and/or associated with the baseband processor 410 to provide carrying out various functions in accordance with one or more embodiments of the disclosure.

It should be appreciated that not all of the components, device elements, and hardware illustrated in and described with respect to the wireless communication device 600 of FIG. 4 may be essential to this disclosure, and thus, some of these items may be omitted, consolidated, or otherwise modified within reason. Additionally, in some implementations, the subject matter associated with the wireless communication device can be configured to include additional or substitute components, device elements, or hardware, beyond those depicted within the illustrations of FIG. 4.

Figure 5:
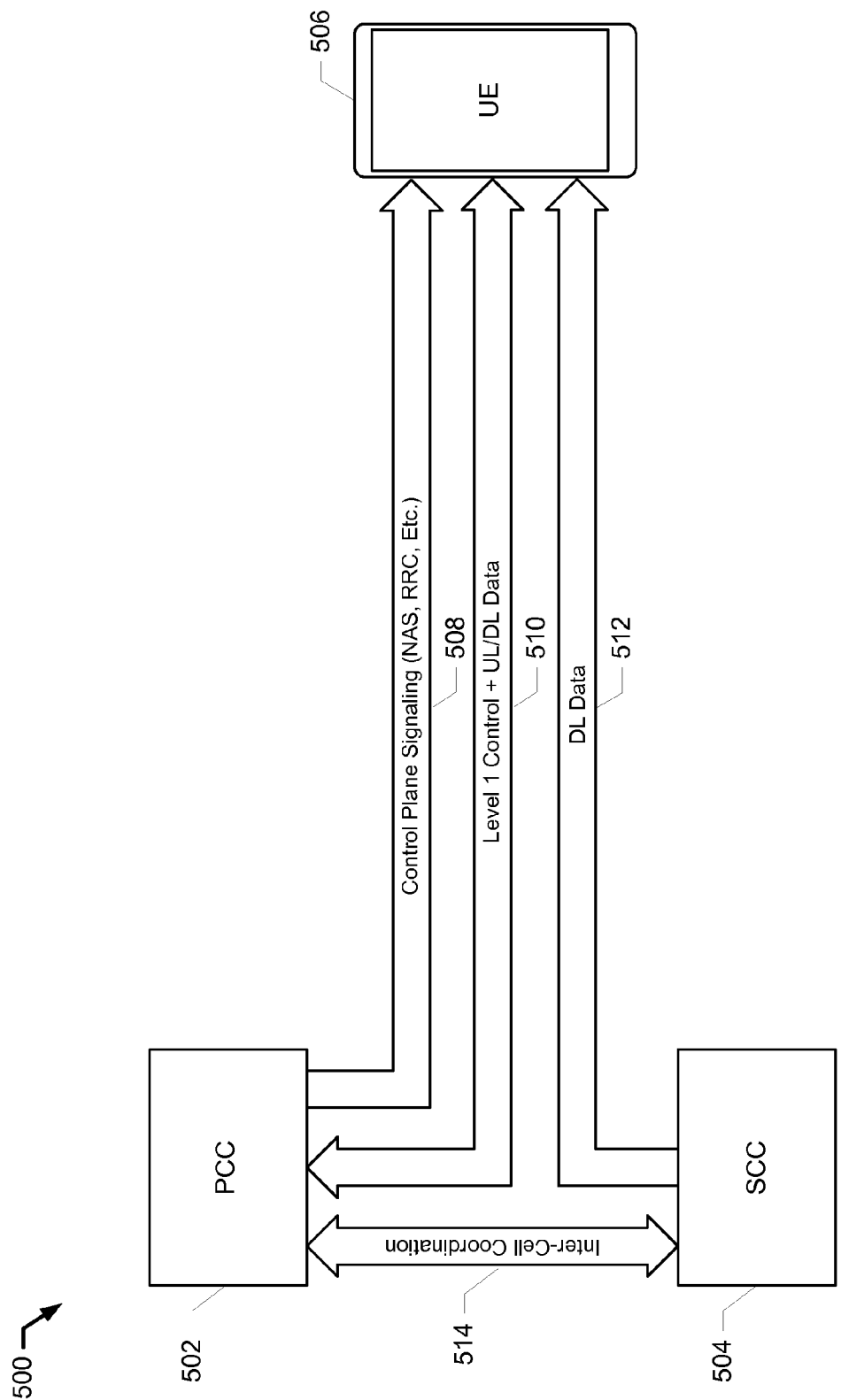
FIG. 5 illustrates a diagram of data and signaling communication between a UE and a set of network component carriers for carrier aggregation in an LTE network, in accordance with various embodiments of the disclosure.

FIG. 5 illustrates a block diagram 500 of control signaling and data communication using both a primary component carrier (PCC) 502, (which can include both downlink and uplink communication with a particular "primary" cell of a wireless network), and a secondary component carrier (SCC) 504, (which can provide downlink communication from another particular "secondary" cell of the wireless network). Control plane signaling, e.g., for non-access stratum (NAS) signaling and radio resource control (RRC) signaling, can be communicated between the wireless network via the primary component carrier to a wireless communication device, e.g., user equipment (UE) 506. The UE 506 can include an LTE and/or LTE-A compliant wireless communication device as described elsewhere herein capable of communicating with one or more eNodeB (base stations) of a wireless network operating in accordance with LTE and/or LTE-A wireless communication protocols. The UE 506 can be capable of communicating with the wireless network via both the PCC 502 and the SCC 504 simultaneously, e.g., using LTE-A carrier aggregation radio access technology (RAT). In some embodiments, downlink (DL) data is communicated from the wireless network to the UE 506 using both the PCC 502 and the SCC 504 simultaneously, i.e., employing a form of carrier aggregation as specified in various LTE/LTE-A wireless communication protocols, to provide an increased bandwidth and increased downlink data rate and/or throughput performance. In some embodiments, uplink (UL) data is communicated from the UE 506 to the wireless network using only the PCC 502 (and not the SCC 504) in accordance with one or more LTE/LTE-A wireless communication protocols. Thus, in some embodiments, the UE 506 can be configured to use carrier aggregation modes that use multiple parallel frequency carriers in shared, adjacent, or distinct frequency bands in the downlink direction and a single frequency carrier in the uplink direction. In some embodiments, all level 1 (L1) physical (PHY) layer control data communication 510 is communicated via the PCC 502, e.g., by a default configuration and/or in accordance with LTE/LTE-A wireless communication protocols. In some embodiments, coordination of the communication of packet data to and from the UE via the PCC 502 and the SCC 504 through two separate cells can be provided using an "inter-cell" communication link 514 between the cells.

LTE Release 10 (and following version releases) provide for the support of wider transmission bandwidths using the aggregation of multiple component carriers in the downlink and/or uplink directions between multiple cells of a wireless network and a wireless communication device. Each component carrier is backward compatible with a structure described for carriers in LTE Release 8. Carrier aggregation can be used to provide wider bandwidths (and thus higher data rates, high throughput performance, etc.) using contiguous radio frequency spectrum, e.g., as illustrated by the diagram 300 in FIG. 3A, or non-contiguous radio frequency spectrum, e.g., as illustrated by the diagrams 310/320 in FIG. 3B and FIG. 3C respectively. Non-contiguous component carriers can be within a common frequency band, e.g., "Band A" as shown by diagram 310 in FIG. 3B, or within separate frequency bands, e.g., "Band A" and "Band B" as shown by diagram 320 in FIG. 3C. For the following description, the wireless communication device can include two antennas, e.g., a primary antenna 438 and a diversity antenna 440, and a switch matrix that can interconnect various radio frequency component blocks to the antennas 438/440, e.g., primary RF component block 442, which can include both transmit (Tx) and receive (Rx1) capabilities, and diversity RF component block 444, which can include receive (Rx2) capability. The switch matrix can provide for coupling the RF component blocks 442/444 to the two antennas 438/440 as required for downlink reception, e.g., via two antennas using carrier aggregation of two component carriers, and for uplink reception, e.g., via one antenna using a single component carrier. In some embodiments, the mobile wireless communication device can include a plurality of antennas and a plurality of RF component blocks, which can be interconnected through a switch matrix as required for reception of a plurality of component carriers using carrier aggregation and also for transmission via one component carrier. In some embodiments, uplink communication can use multiple component carriers for uplink carrier aggregation (not shown). In some embodiments, the RF component blocks 442/444 can be "tuned" by control signals provided by the baseband processor 410 (and/or by the processor 404 of the processing circuitry 402) to adjust transmission and/or reception characteristics when coupled to the primary and/or diversity antennas 438/440. In some embodiments, downlink communication uses two component carriers received through a common antenna, e.g., the primary and secondary component carriers used for carrier aggregation can be received via the primary antenna 438 coupled with the primary RF component block 442. If the primary RF component block 442 is "tuned" for reception based on characteristics of the primary component carrier alone, maximum power transfer for the primary component carrier signals can be realized; however, reception of the secondary component carrier may be less than optimal. For example, if the power transfer for the primary component carrier is accorded a normalized value of "one," the power transfer for the secondary component carrier can be less than "one," and in some cases substantially so. For example the secondary component carrier can realize a normalized power transfer value that is "one-half," which can represent 3 dB less power transfer than provided via the primary component carrier through the same antenna, due to the inefficient transfer of power when setting the characteristics of the primary RF component block 442 according to the primary component carrier without regard to the secondary component carrier. Setting of the primary RF component block 442 to "match" to the primary antenna 438 in order to maximize the total downlink throughput that can be realized using the combination of the primary component carrier and the secondary component carrier jointly can result in improved downlink performance, as the downlink throughput can be based on the reception of downlink data via both primary and secondary component carriers together using carrier aggregation. Uplink communication, however, can be realized, in some embodiments, using only the primary component carrier, and thus uplink transmit power transfer matching via the same primary antenna used for downlink reception and via the primary RF component block 442 "tuned" for reception through the primary antenna 438 can be less than optimal for uplink communication in some circumstances. The wireless communication device can take into account both downlink performance realized when using carrier aggregation and uplink performance when matching RF component blocks to antennas to balance the performance for uplink and downlink by the selection of settings for the RF component block 442. Similarly when using the diversity antenna 440, e.g., for multiple-input multiple-output (MIMO) reception and/or for "diversity" reception (i.e., to provide for a second downlink communication path by which the same information can be received as on the first downlink communication path through the primary antenna), the mobile wireless communication can "tune" settings for both the primary RF component block 442 and the diversity RF component block 444 to ensure maximal downlink reception while ensuring adequate (if in some cases suboptimal) uplink transmission performance. In circumstances, such as when the uplink transmission performance is determined by the wireless communication device to be power limited, i.e., the uplink is at or near its maximum transmit power levels and the wireless communication device determines that uplink performance is or may be impaired, the wireless communication device can adjust the settings of the RF component blocks 442 and/or 444 to provide for improved uplink performance while minimizing the impact on the downlink performance when using carrier aggregation. As uplink communication uses the primary component carrier, selecting settings for the RF component blocks 442 and/or 444 to maximize reception and transmission on the primary component carrier can provide for maximum uplink performance and a high level of downlink performance (although this may be less than optimal for downlink given the suboptimal setting for the secondary component carrier). Uplink performance can impact downlink performance indirectly, e.g., when ACK/NACK or other uplink messages are required to acknowledge or otherwise continue downlink communication. Thus, downlink performance, in some embodiments, can be impacted by uplink performance. A mechanism to improve the downlink performance, e.g., in carrier aggregation scenarios, while also accounting for uplink performance when adjusting settings for the primary RF component block 442 and/or the secondary component block 444 to match to characteristics of the primary antenna 438 and/or the secondary antenna 440 can be desired. Adjusting the settings of the primary and second component blocks 442/444 can also be referred to, in some embodiments, as adjusting tuner settings and/or adjusting antenna tuner settings for the RF front end 436 of a mobile wireless communication device.

Settings for the RF front end 436, e.g., for the primary and second RF component blocks 442/444, can account for downlink performance using multiple component carriers via carrier aggregation and uplink performance using a single component carrier. In some embodiments, the uplink component carrier and a primary downlink component carrier share the same RF component block, e.g., primary RF component block 442, connected to a primary antenna 438, and optionally connected to a diversity antenna 440. The settings for the RF front end 436 can account for (1) carrier aggregation (e.g., whether enabled), (2) uplink performance (e.g., determined using a variety of metrics), (3) downlink performance (e.g., determined using a variety of metrics including accounting for carrier aggregation), (4) component carrier frequency values, and (5) frequency bands used for component carriers. When uplink performance is determined to be not power limited, a setting that provides for maximizing a combined downlink performance via both component carriers can be selected. One or more representative downlink performance metrics can be used to determine a setting that maximizes the downlink performance through both component carriers, e.g., measures of signal strength, signal quality, throughput data rate, downlink bit error rates, downlink block error rates, etc. When uplink performance is determined to be power limited, the setting that provides for maximizing downlink performance via a primary component carrier can be selected. In some embodiments, maximizing downlink performance via the primary component carrier can also provide for improved uplink performance, as the uplink can use the primary component carrier as well. In some embodiments, detecting whether the uplink is power limited can be based on detecting uplink transmit power setting values, e.g., when an uplink transmit power level is higher than an uplink transmit power threshold, the mobile wireless device can consider that the uplink is power limited. Alternatively, or additionally, the mobile wireless device can detect that the uplink is power limited based on a measure of uplink performance, e.g., detecting an uplink block error rate (BLER) that is higher than a block error rate threshold and/or changes in a block error rate (e.g., increasing). The mobile wireless device can also determine that the uplink is power limited based on detecting repeated random access channel (RACH) attempts and failures in the uplink direction (particularly when signal power levels and/or signal quality levels indicate that uplink communication should be OK and/or that a communication channel in the downlink direction exceeds one or more signal strength or quality metrics.) In some embodiments, the mobile wireless device compares uplink performance (error rates, reported signal quality, reported signal strength, uplink retransmission attempts, or uplink access attempts) to downlink metrics (e.g., received signal strength, received signal quality) and determines that the mobile wireless device is uplink power limited when the uplink performance does not match to the downlink metrics. The mobile wireless device can also determine whether the uplink is power limited when an uplink power headroom (PHR) value is low (e.g., at or near zero) while the uplink data rate is also low (e.g., when the modulation and coding scheme selected for uplink has a relatively low value), thus the uplink appears to be power limited (low/no power headroom and low uplink data rates). The mobile wireless device, in some embodiments, can also determine that the uplink is power limited based on an asymmetry of downlink performance, e.g., via the primary component carrier, and uplink performance, e.g., via the same primary component carrier. In some embodiments, when downlink indicates a signal strength and/or signal quality above a particular signal strength threshold or signal quality threshold, while the uplink simultaneously indicates low data rates, low performance, low data rates, repeated retransmissions required, repeated access attempts required, or other metrics that indicate poor uplink signal strength or signal quality, the mobile wireless device can determine that the uplink is power limited.

Figure 6A:
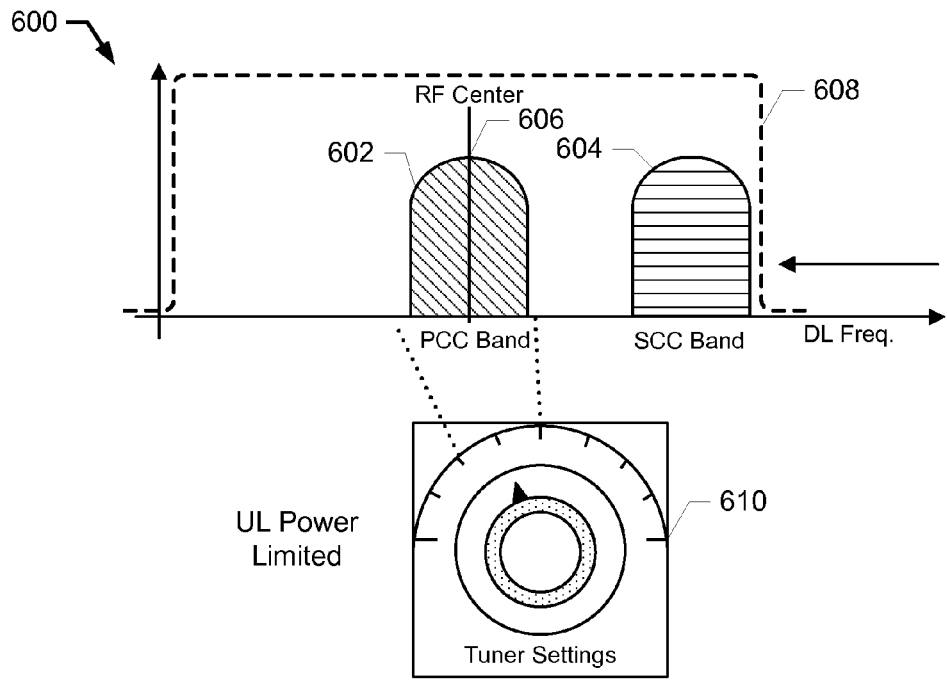
FIGS. 6A and 6B illustrate representative antenna tuner settings for a UE using carrier aggregation, in accordance with various embodiments of the disclosure.

FIG. 6A illustrates a diagram 600 of a representative tuner setting 610 for the RF front end 436, e.g., for the primary RF component block 442 and/or for the diversity RF component block 444, in which the primary RF component block 442 and/or the diversity RF component block 444 is matched (or equivalently "tuned") to provide for maximal power transfer communicated via a primary component carrier at RF center frequency 606 and occupying a primary component carrier radio frequency band 602, while also receiving (sub-optimally) radio frequency signals via a secondary component carrier radio frequency band 604. The tuner setting 610 illustrated in FIG. 6A can be used by the wireless communication device upon determining that uplink communication is power limited, e.g., by using one or more metrics as described hereinabove. The tuner setting 610 can adjust a range of frequency values for which power transfer is maximized via an antenna and a set of RF circuitry in a wireless communication device, in some embodiments. In carrier aggregation scenarios, e.g., when using a primary component carrier and a secondary component carrier simultaneously to transfer data and signaling information from an eNodeB (or other equivalent base station) of a wireless network to a wireless communication device, the tuner setting 610 can be "biased" to favor maximum received power transfer via the primary component carrier. The tuner setting 610 can also provide for maximum transmitted power transfer via the primary component carrier, e.g., in the uplink direction from the mobile wireless device to the eNodeB of the wireless network. The tuner setting 610 can adjust a center frequency at which a peak power transfer can occur for signals received by an antenna matched to a set of RF circuitry. In some embodiments, the tuner setting 610 can adjust the center (or median) radio frequency of a "pass-band" filter 608 to be coincident with the center frequency of the primary component carrier. In some embodiments, the "pass-band" filter 608 represents a frequency band over which radio frequency power transfer is effectively maximized by selecting the tuner setting 610 using one or more components an RF front end 436, e.g., in the primary RF component block 442 and/or in the diversity RF component block 444. By tuning the primary RF component block 442 and/or the diversity RF component block 444 for optimal transfer via the primary component carrier, the mobile wireless communication device can seek to maximum downlink performance via the primary component carrier also to maximize uplink performance via the primary component carrier. Additional downlink performance via the secondary component carrier can be provided but may be suboptimal for this tuner setting; however, when uplink power limited, the mobile wireless communication device can compromise the downlink performance in order to ensure adequate uplink performance. In some embodiments, downlink reception is provided via only one antenna, e.g., the primary antenna 438 and/or via the diversity antenna 440, and an accompanying RF component block, e.g., the primary RF component block 442 or the diversity RF component block 444, can be "tuned" to match power transfer characteristics based on the detection of uplink power limited conditions as described herein. In some embodiments, reception is provided via two antennas simultaneously, e.g., the primary antenna 438 and the diversity antenna 440, and both the primary RF component block 442 and the diversity RF component block 444 can be tuned as indicated in FIG. 6A.

Figure 6B:
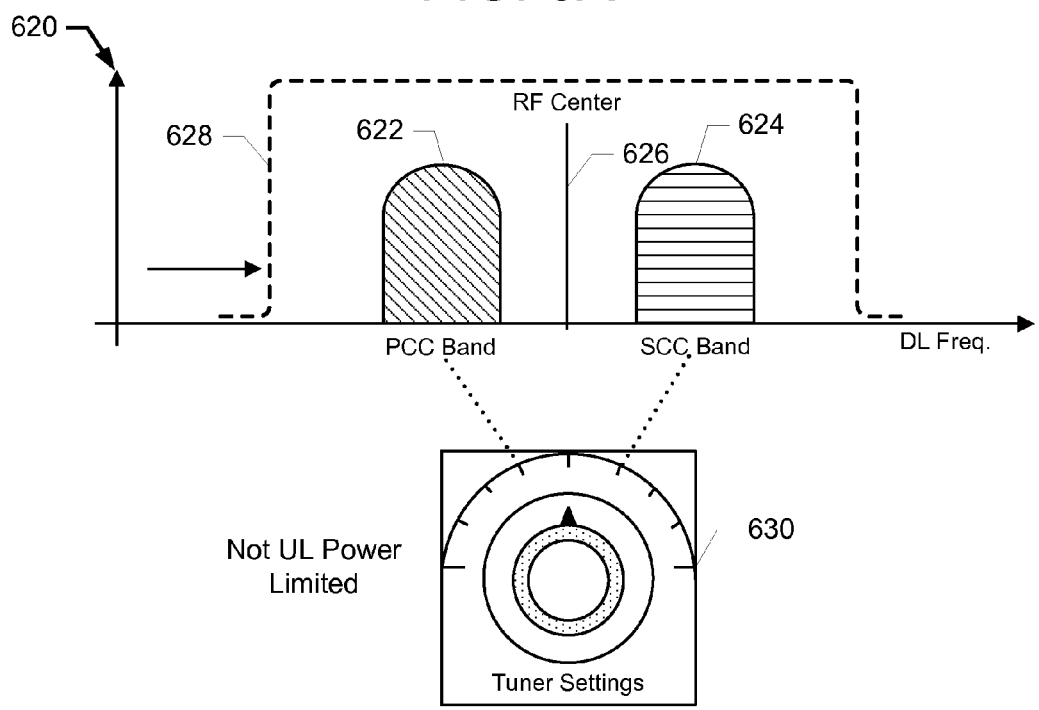

FIG. 6B illustrates a diagram 620 of a representative tuner setting 630 for the RF front end 436, e.g., for the primary RF component block 442, in which the RF component block 442 is tuned to provide maximal combined power transfer via a primary component carrier spanning the primary component carrier band 622 and also via a secondary component carrier spanning the secondary component carrier band 624. The tuner setting 630 can represent a "compromise" setting that balances a power transfer via the primary component carrier and the secondary component carrier equally, or depending on downlink channel conditions to maximize downlink data throughput using the combination of the primary component carrier and the secondary component carrier. In some embodiments, the center radio frequency 626 of a pass-band filter 628 can be adjusted in between the center frequencies of the primary and secondary component carrier bands 622/624. In some embodiments, the "pass-band" filter 628 represents a frequency band over which radio frequency power transfer is effectively maximized by selecting the tuner setting 630 using one or more components an RF front end 436, e.g., in the primary RF component block 442 and/or in the diversity RF component block 444. In some embodiments, the tuner setting 630 can be used to maximize downlink performance, e.g., as measured by data rate and/or power transfer via one or more antennas, e.g., via the primary and/or the diversity antennas 438/440. The tuner setting 630 illustrated in FIG. 6B can be used when the mobile wireless device determines that uplink communication/performance is not power limited, e.g., the uplink performance satisfies a set of performance criteria or exceeds a particular data rate or is at or below a particular error threshold or based on another set of metrics as described herein. In some embodiments, downlink reception is provided via only one antenna, e.g., the primary antenna 438 and/or via the diversity antenna 440, and an accompanying RF component block, e.g., the primary RF component block 442 or the diversity RF component block 444, can be "tuned" to match power transfer characteristics based on detection of whether uplink power limited conditions exist as described herein. In some embodiments, reception is provided via two antennas simultaneously, e.g., the primary antenna 438 and the diversity antenna 440, and both the primary RF component block 442 and the diversity RF component block 444 can be tuned as indicated in FIG. 6B.

Figure 7A:
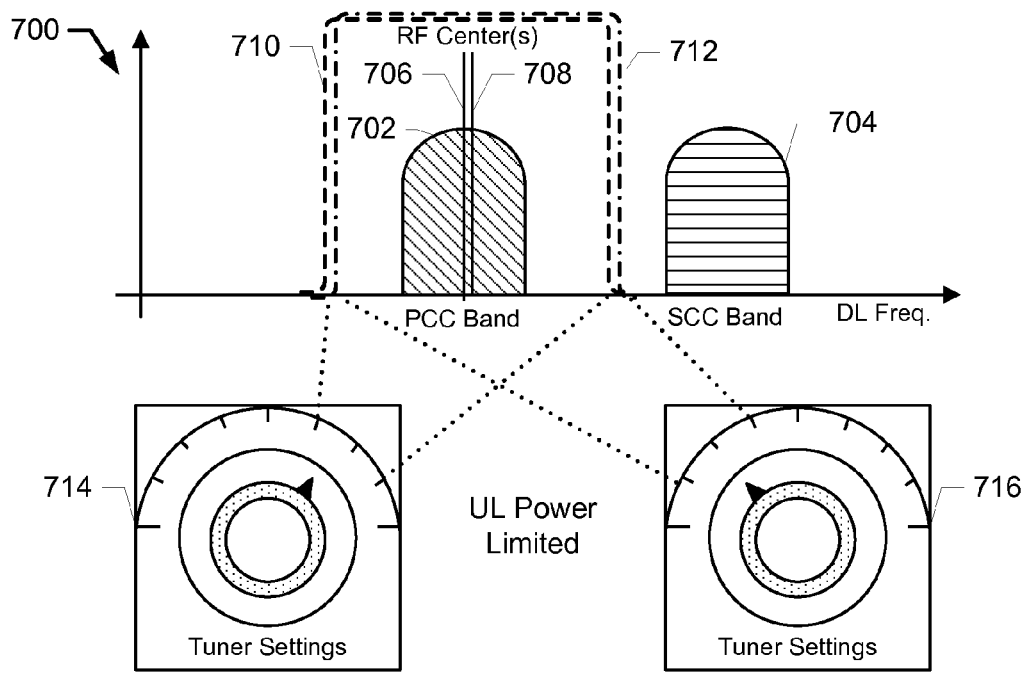
FIGS. 7A and 7B illustrate additional representative antenna tuner settings for a UE using carrier aggregation, in accordance with various embodiments of the disclosure.

FIG. 7A illustrates a diagram 700 of a representative tuner setting 714 for a first set of RF circuitry, e.g., for primary RF component block 442, of the RF front end 436 of a mobile wireless communication device, and a representative tuner setting 716 for a second set of RF circuitry, e.g., for diversity RF component block 444, of the RF front end 436 of the mobile wireless communication device. As illustrated in FIG. 7A, the tuner setting 714 can be adjusted to maximize a radio frequency power transfer for downlink transmission through a primary component carrier at RF center frequency 706 spanning a primary component carrier frequency band 702 and can exclude (and/or otherwise not account for) radio frequency power transfer for downlink transmission through a secondary component carrier spanning a secondary component carrier frequency band 704. As also illustrated in FIG. 7A, the tuner setting 716 can also be adjusted to maximize a radio frequency power transfer for downlink transmission through the primary component carrier at RF center frequency 708 spanning the primary component carrier frequency band 702 and can exclude (and/or otherwise not account for) radio frequency power transfer for downlink transmission through a secondary component carrier spanning a secondary component carrier frequency band 704. In some embodiments, the RF center frequencies 706 and 708 can be coincident (or nearly so). The tuner setting 714 illustrated in FIG. 7A can be used by the wireless communication device upon determining that uplink communication is power limited, e.g., using measures as described hereinabove. The tuner setting 714 can adjust the center radio frequency of a "pass-band" filter 710 to be coincident with the center frequency of the primary component carrier, in some embodiments. In some embodiments, the "pass-band" filter 710 represents a frequency band over which radio frequency power transfer is effectively maximized by selecting the tuner setting 714 using one or more components an RF front end 436, e.g., in the primary RF component block 442. By tuning the primary RF component block 442 for optimal transfer via the primary component carrier, the mobile wireless communication device can seek to maximum downlink performance via the primary component carrier also to maximize uplink performance via the primary component carrier. Thus under uplink power limited conditions, the wireless communication device can ensure adequate uplink performance and maximize downlink performance through the primary component carrier at the expense of additional downlink performance via the secondary component carrier. In some embodiments, the tuner setting 716 can adjust the center radio frequency of a "pass-band" filter 712 to be coincident with the center frequency of the primary component carrier, in some embodiments. In some embodiments, the "pass-band" filter 712 represents a frequency band over which radio frequency power transfer is effectively maximized by selecting the tuner setting 716 using one or more components an RF front end 436, e.g., in the diversity RF component block 444. By tuning the diversity RF component block 444 for optimal transfer via the primary component carrier, the mobile wireless communication device can seek to maximum downlink performance via the primary component carrier over a diversity path (e.g., via the diversity antenna 440). In some embodiments, the tuner setting 714 corresponds to matching a first set of RF circuitry (e.g., the primary RF component block 442) in the RF front end 436 to a first antenna (e.g., the primary antenna 438), and the tuner setting 716 corresponds to matching a second set of RF circuitry (e.g., the diversity RF component block 444) in the RF front end 436 to a second antenna (e.g., the diversity antenna 440).

Figure 7B:
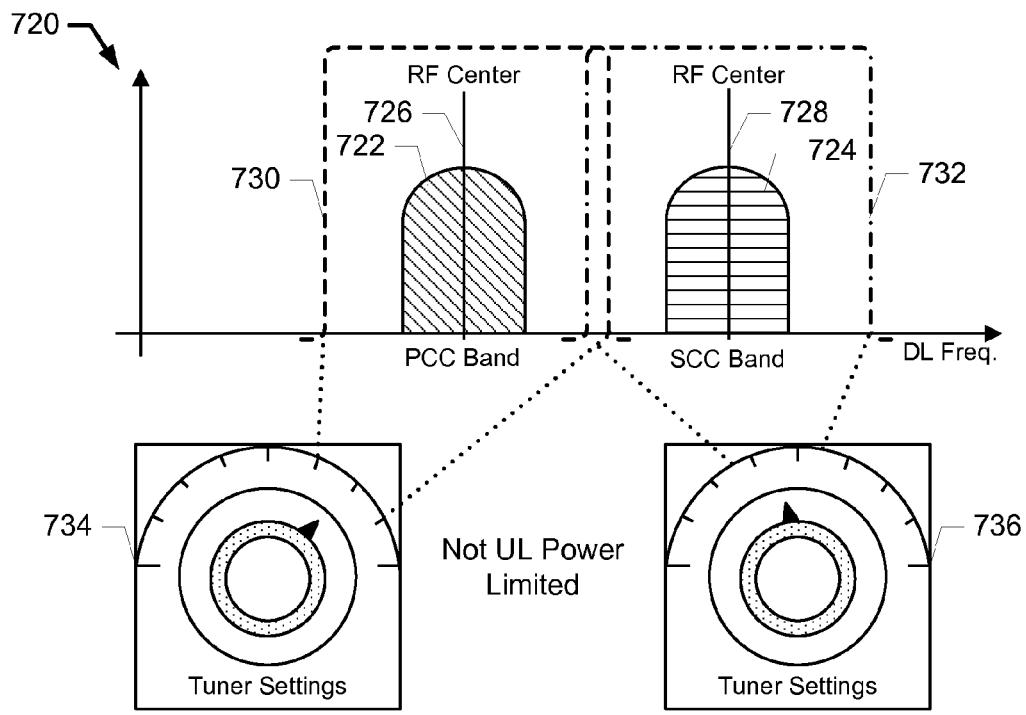

FIG. 7B illustrates a diagram 720 of a representative tuner setting 734 for the RF front end 436, e.g., for the primary RF component block 442, in which the RF component block 442 is tuned to provide maximal combined power transfer via a primary component carrier spanning the primary component carrier band 722. In some embodiments, the center radio frequency 726 of a pass-band filter 730 can be adjusted to the center frequency of a frequency band 722 used by the primary component carrier. In some embodiments, the "pass-band" filter 730 represents a frequency band over which radio frequency power transfer is effectively maximized by selecting the tuner setting 734 using one or more components an RF front end 436, e.g., in the primary RF component block 442. In some embodiments, the tuner setting 734 can be used to maximize downlink performance, e.g., as measured by data rate and/or power transfer via an antenna, e.g., via the primary antenna 438. The tuner setting 734 illustrated in FIG. 7B can be used when the mobile wireless device determines that uplink communication/performance is not power limited, e.g., the uplink performance satisfies a set of performance criteria or exceeds a particular data rate or is at or below a particular error threshold or based on another set of metrics as described herein. FIG. 7B also illustrates a representative tuner setting 736 for the RF front end 436, e.g., for the diversity RF component block 444, in which the RF component block 444 is tuned to provide maximal combined power transfer via a secondary component carrier spanning the secondary component carrier band 724. In some embodiments, the center radio frequency 728 of a pass-band filter 732 can be adjusted to the center frequency of the frequency band 724 used by the secondary component carrier. In some embodiments, the "pass-band" filter 732 represents a frequency band over which radio frequency power transfer is effectively maximized by selecting the tuner setting 736 using one or more components of the RF front end 436, e.g., in the diversity RF component block 444. In some embodiments, the tuner setting 736 can be used to maximize downlink performance, e.g., as measured by data rate and/or by power transfer via an antenna, e.g., via the diversity antenna 440. The tuner setting 736 illustrated in FIG. 7B can be used when the mobile wireless device determines that uplink communication performance is not power limited, e.g., the uplink performance satisfies a set of performance criteria or exceeds a particular data rate or is at or below a particular error threshold or based on another set of metrics as described herein. FIG. 7B illustrates a tuner setting 734 that can match a first antenna, e.g., the primary antenna 438, to a first component carrier, e.g., the primary component carrier over a primary downlink transmission path (and can also provide for uplink transmission) using a first set of RF component circuitry, e.g., the primary RF component block 442, of the RF front end 436 of the mobile wireless communication device. FIG. 7B also illustrates a tuner setting 736 that can match a second antenna, e.g., the diversity antenna 440, to a second component carrier, e.g., the diversity component carrier over a diversity downlink transmission path using a second set of RF component circuitry, e.g., the diversity RF component block 444, of the RF front end 436 of the mobile wireless communication device.

Figure 8:
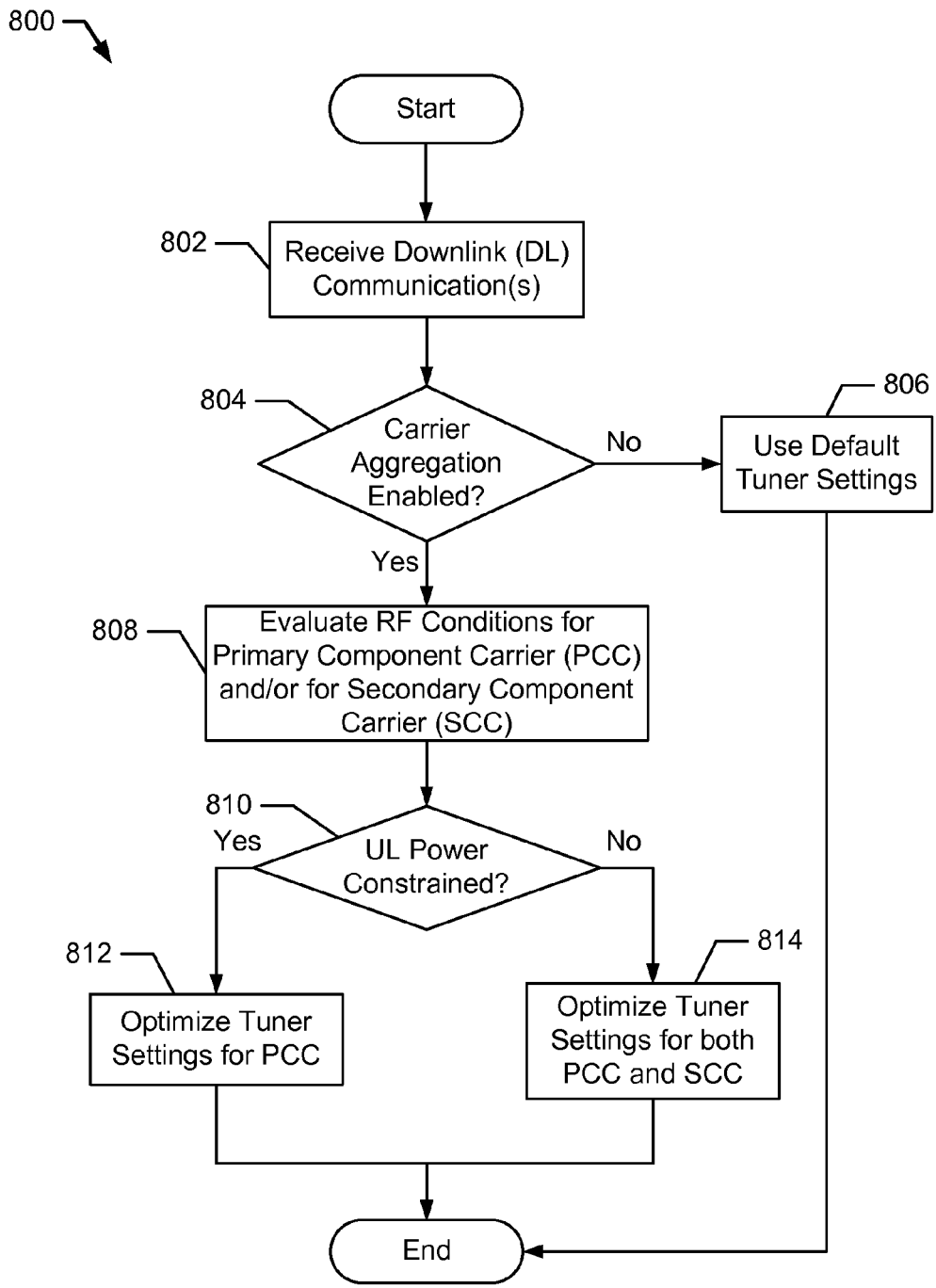
FIG. 8 illustrates a flowchart depicting a procedure for dynamically selecting antenna tuner settings in a UE, in accordance with some embodiments of the disclosure.

FIG. 8 illustrates a flowchart 800 for a representative method for dynamically adjusting radio frequency circuitry of an RF front end, e.g., adjusting antenna tuner settings, in a mobile wireless communication device based on carrier aggregation, downlink performance, and/or uplink performance, in accordance with some embodiments. In some embodiments, the method illustrated in flowchart 800 can be used to maximize downlink data communication in a carrier aggregation scenario with multiple component carriers used for downlink radio frequency transmission from a wireless network to the mobile wireless device, while simultaneously monitoring adjusting settings for uplink communication as required to ensure adequate uplink performance. In step 802, the mobile wireless communication device receives one or more downlink communications. In some embodiments, the mobile wireless communication device can monitor downlink and/or uplink performance based on data packets and/or signaling messages and/or control messages received. In step 804, the mobile wireless communication device determines whether carrier aggregation is enabled. When carrier aggregation is not enabled, the method proceeds to step 806, in which the mobile wireless communication device can adjust radio frequency circuitry in a radio frequency front end to use a set of default values. In some embodiments, the set of default values correspond to adjustments/settings for RF circuitry, e.g., antenna tuner settings, that can provide for maximum downlink and/or maximum uplink performance in the absence of the use of carrier aggregation, e.g., in accordance with LTE wireless communication protocol release 8 or earlier, or in accordance with options of LTE wireless communication protocol release 9 or later in which carrier aggregation is not used. When carrier aggregation is enabled, the mobile wireless communication device can evaluate radio frequency conditions in step 808 for a first component carrier, e.g., for communication via a primary carrier cell, and/or for a second component carrier, e.g., for communication via a secondary carrier cell. In some embodiments evaluation of radio frequency conditions can be based on one or more of: uplink transmit power settings, uplink transmit power headroom, downlink signal power, downlink signal quality, downlink retransmission attempts, uplink random access channel attempts and/or failures, and uplink modulation coding scheme (MCS) values. In step 810, the mobile wireless communication device can determine whether uplink communication is power constrained (power limited), e.g., based on the one or more radio frequency conditions evaluated in step 808. When the mobile wireless communication device determines that uplink communication is power constrained, the mobile wireless communication device can select in step 812 a set of radio frequency component settings, e.g., antenna tuner settings, for the radio frequency front end to be optimized for transmission, reception, or both transmission and reception via a primary component carrier. The mobile wireless device can optimize RF front end circuitry for power transfer and/or data throughput and/or signal quality and/or signal power or other metrics that seek to maximize performance in a downlink direction and in an uplink direction using the primary component carrier. When the mobile wireless communication device determines that uplink communication is not power constrained, the mobile wireless communication device can select in step 814 a set of radio frequency component settings, e.g., antenna tuner settings, for the radio frequency front end to be optimized for throughput and/or signal quality and/or signal power or other metrics that seek to maximize performance in the downlink direction using both the primary component carrier and a secondary component carrier. In some embodiments, adjusting the RF front end circuitry includes tuning RF component blocks when used with one antenna or when used with a plurality of antennas. In some embodiments, adjusting the RF front end circuitry includes tuning a first RF component block to match to a first antenna and tuning a second RF component block to match to a second antenna. In some embodiments, adjusting the RF front end circuitry includes tuning the first RF component block to match the first antenna when used with a primary component carrier and/or with a secondary component carrier as part of a carrier aggregation communication, e.g., in accordance with an LTE and/or LTE-A wireless communication protocol. In some embodiments, adjusting the RF front end circuitry includes tuning the second RF component block to match the second antenna when used with the primary component carrier and/or the secondary component carrier as part of a carrier aggregation communication, e.g., in accordance with an LTE and/or LTE-A wireless communication protocol.

Figure 9:
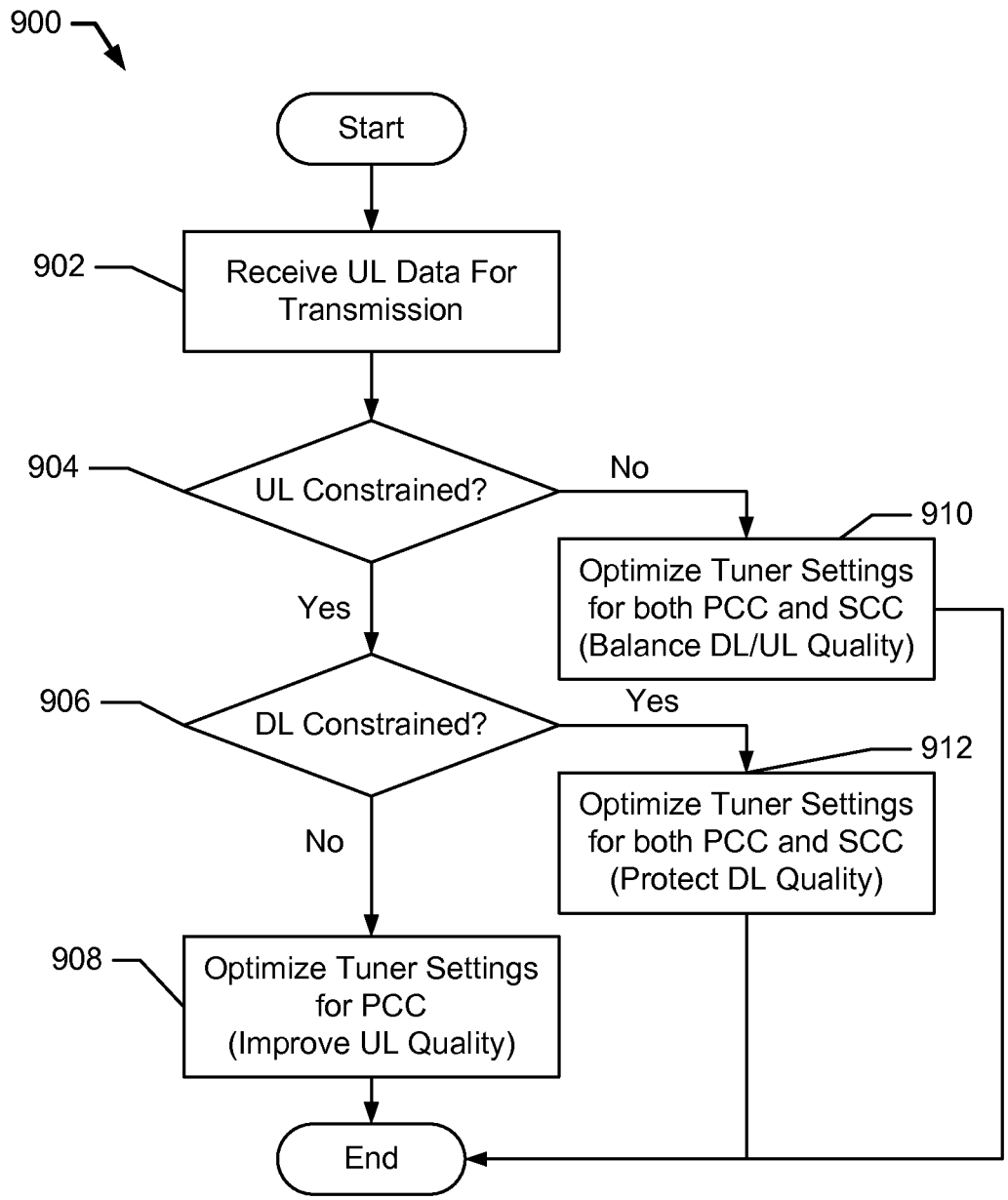
FIG. 9 illustrates another flowchart depicting a procedure for dynamically selecting antenna tuner settings in a UE, in accordance with some embodiments of the disclosure.

FIG. 9 illustrates another flowchart 900 depicting a procedure for dynamically selecting antenna tuner settings in a mobile wireless communication device, e.g., a UE, in accordance with some embodiments. In step 907, the mobile wireless communication device receives a set of uplink data packets to transmit from the mobile wireless communication device to a wireless network, e.g., to an eNodeB (or equivalent base station). In step 904, the mobile wireless communication device determines whether uplink transmission is limited, constrained, or otherwise impaired, e.g., inadequate data rate, performance metrics below a threshold level, link instability, repeated retransmission attempts, repeated access channel attempts, etc. The mobile wireless device can use one or more different metrics and/or test conditions by which to determine that uplink transmissions are constrained. In some embodiments, the mobile wireless communication device can determine that the uplink is constrained based on transmit power headroom (e.g., a low value), transmit power signaling commands (e.g., repeated attempts to increase uplink transmit power), transmit power level (e.g., at or above a threshold level), uplink data rate performance (e.g., uplink bit error rate and/or uplink block error rate), uplink performance relative to downlink performance (e.g., increasing and/or high uplink bit/block error rate when downlink receive signal strength and/or quality is relatively high, such as compared to a downlink signal strength and/or quality threshold level), uplink radio access channel attempts (e.g., repeated RACH failures with adequate or higher downlink receive signal levels), asymmetry in uplink to downlink quality, (e.g., limited or low uplink data rate with high uplink data rate relative to thresholds). When the mobile wireless communication device determines that uplink communication is not constrained, the mobile wireless communication device can in step 910 adjust radio frequency circuitry in a radio frequency front end to optimize for reception via both a primary component carrier and a secondary component carrier simultaneously, e.g., to maximize downlink throughput, while also providing for (and monitoring) uplink transmissions via the primary component carrier. In some embodiments, the mobile wireless communication device adjusts one or more antenna tuner settings to maximize power transfer for a set of radio frequencies that include both the primary component carrier and the secondary component carrier. In some embodiments, the mobile wireless communication device optimizes antenna tuner settings to balance uplink and downlink quality. When the mobile wireless communication device determines that the uplink communication is constrained, e.g., power limited, the mobile wireless communication device determines in step 906 whether downlink communication is also constrained. The mobile wireless communication device can use a set of one or more metrics, e.g., downlink signal strength, downlink signal quality, downlink data rates, and/or downlink error rates relative to appropriate threshold levels to determine whether the downlink communication is constrained. When both downlink and uplink communication are both constrained, the mobile wireless communication device can adjust radio frequency circuitry settings, e.g., adjust antenna tuner settings, in step 912 to use both a primary component carrier and a secondary component carrier to improve and/or protect quality for downlink communication while also providing sufficient uplink communication. In some embodiments, the tuner settings selected in step 910 can differ from those selected in step 912, even though both can optimize for communication using a combination of primary and secondary component carriers. In particular, in step 912, the radio frequency adjustments can be "biased" to favor downlink communication over uplink communication when both downlink and uplink are constrained. In some embodiments, the tuner settings can be selected to provide at least a minimum downlink quality level for downlink communication, e.g., a minimum signal quality level, a minimum signal power level, a minimum downlink data rate, or another measurable downlink communication quality level. When the wireless communication device determines that uplink communication is constrained, e.g., power limited, while downlink communication is not constrained, e.g., not power limited, the mobile wireless communication device can adjust radio frequency circuitry, e.g., select antenna tuner settings, to optimize communication using the primary component carrier, e.g., to "bias" the settings for communication via the primary component carrier that can be used for both downlink communication and for uplink communication. In some embodiments, the mobile wireless communication device optimizes antenna tuner settings in step 908 to improve uplink data communication, such as by providing at least a minimum uplink quality level for uplink communication, e.g., based on uplink data rates, uplink signal quality, uplink signal strength, uplink data link stability, or other measurable uplink data communication quality levels.

Figure 10:
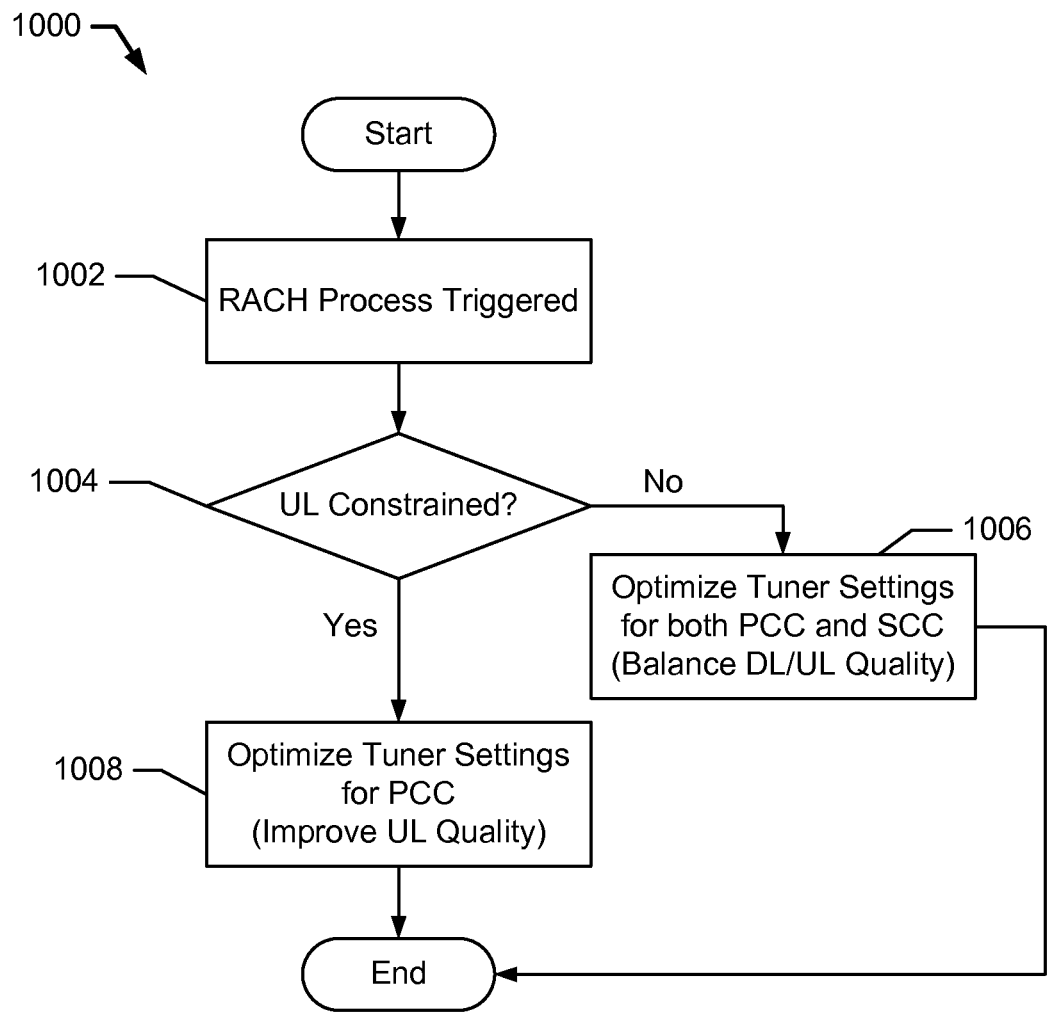
FIG. 10 illustrates a further flowchart depicting a procedure for dynamically selecting antenna tuner settings in a UE, in accordance with some embodiments of the disclosure.

FIG. 10 illustrates a further flowchart 1000 depicting a procedure for dynamically adjusting radio frequency circuitry, e.g., adjusting tuner settings for one or more antennas, in a mobile wireless communication device in accordance with some embodiments. In step 1002, the mobile wireless communication device determines whether a random access channel (RACH) process is triggered, e.g., when the mobile wireless communication device attempts to establish communication in the uplink direction with a wireless network using a RACH procedure. In step 1004, the mobile wireless communication device determines whether uplink communication is constrained, e.g., when a number of RACH procedure attempts have failed within a time window, and/or repeatedly, and/or for a particular number of consecutive RACH failures, while downlink communication is not constrained, e.g., when a downlink received signal power level and/or downlink signal quality level exceeds a threshold value. The downlink signal strength and/or the downlink signal quality can be used as an indicator of characteristics a communication channel path between the mobile wireless communication device and an access portion of a wireless network, e.g., an eNodeB. In some embodiments, the downlink signal strength and/or signal quality provides an indicator of signal quality using a primary component carrier, which can also be used in the uplink direction by the wireless communication device. When the mobile wireless communication device determines in step 1004 that the uplink is not constrained, the mobile wireless communication device in step 1006 can adjust settings for radio frequency circuitry, e.g., optimize antenna tuner settings, in a radio frequency front end of the mobile wireless communication device to balance uplink and downlink communication using a combination of primary and secondary component carriers, e.g., to "bias" the settings for power transfer via both the primary and secondary component carriers. When the mobile wireless communication device determines that uplink communication is constrained, e.g., power limited or otherwise impaired, the mobile wireless communication device in step 1008 can adjust radio frequency circuitry, e.g., optimize antenna tuner settings to improve uplink communication, e.g., to "bias" the settings for power transfer via the primary component carrier.

The various aspects, embodiments, implementations or features of the described embodiments can be used separately or in any combination. Further, some aspects of the described embodiments may be implemented by software, hardware, or a combination of hardware and software. The described embodiments can also be embodied as computer program code stored on a non-transitory computer-readable medium. The computer readable-medium may be associated with any data storage device that can store data which can thereafter be read by a computer or a computer system. Examples of the computer-readable medium include read-only memory, random-access memory, CD-ROMs, Solid-State Disks (SSD or Flash), HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. A method to adjust radio frequency circuitry in a wireless communication device, the method comprising the wireless communication device at least:

receiving one or more downlink communications from a wireless network;

determining whether carrier aggregation is enabled;

when carrier aggregation is not enabled, adjusting the radio frequency circuitry based on default setting values; and when carrier aggregation is enabled:

evaluating radio frequency conditions for a primary component carrier and for a secondary component carrier used for carrier aggregation;

determining whether uplink communication is power constrained;

when uplink communication is power constrained, adjusting the radio frequency circuitry to maximize power transfer over a set of radio frequencies through the primary component carrier; and when uplink communication is not power constrained, adjusting the radio frequency circuitry to maximize power transfer over a set of radio frequencies through a combination of the primary component carrier and the secondary component carrier, wherein the wireless communication device determines whether uplink communication is power constrained based at least in part on whether:

an uplink performance metric is less than an uplink performance threshold and a downlink performance metric is greater than a downlink performance threshold, or a downlink received signal strength exceeds a downlink signal strength threshold and a number of uplink random access channel (RACH) failures occur.

2. The method of claim 1, wherein adjusting the radio frequency circuitry comprises matching a set of radio frequency components to one or more antennas.

3. The method of claim 1, wherein:

adjusting the radio frequency circuitry to maximize power transfer over a set of radio frequencies through the primary component carrier comprises setting a center frequency of a pass-band of the radio frequency circuitry to correspond to a first median radio frequency value of the primary component carrier, and adjusting the radio frequency circuitry to maximize power transfer over a set of radio frequencies through the combination of the primary component carrier and the secondary component carrier comprises setting the center frequency of the pass-band of the radio frequency circuitry to correspond to a second median radio frequency value between the primary component carrier and the secondary component carrier.

4. The method of claim 1, further comprising:

adjusting the radio frequency circuitry to maximize a downlink data rate.

5. The method of claim 1, wherein the wireless communication device determines whether uplink communication is power constrained further based at least in part on whether an uplink transmit power headroom is less than a power headroom threshold value or an uplink transmit power level exceeds a transmit power threshold value.

6. A wireless communication device configured to adjust radio frequency circuitry of a radio frequency front end dynamically, the wireless communication device comprising:

the radio frequency front end including at least one antenna and at least one radio frequency component block coupled thereto; and a transceiver and a baseband processor to receive and transmit radio frequency signals via the radio frequency front end;

wherein the baseband processor is configured to:

determine whether carrier aggregation is enabled;

when carrier aggregation is not enabled, adjust settings of the at least one radio frequency component block based on default setting values; and when carrier aggregation is enabled:

evaluate radio frequency conditions for a primary component carrier and for a secondary component carrier used for carrier aggregation;

determine whether uplink communication is power constrained;

when uplink communication is power constrained, adjust the at least one radio frequency component block to maximize power transfer over a set of radio frequencies through the primary component carrier; and when uplink communication is not power constrained, adjust the at least one radio frequency component block to maximize power transfer over a set of radio frequencies through a combination of the primary component carrier and the secondary component carrier, wherein the baseband processor determines whether uplink communication is power constrained based at least in part on whether:

an uplink performance metric is less than an uplink performance threshold and a downlink performance metric is greater than a downlink performance threshold, or a downlink received signal strength exceeds a downlink signal strength threshold and a number of uplink random access channel (RACH) failures occur.

7. The wireless communication device of claim 6, wherein the baseband processor adjusts settings of the at least one radio frequency block by matching a set of radio frequency components to the at least one antenna.

8. The wireless communication device of claim 6, wherein the baseband processor adjusts settings of the at least one radio frequency block to:

maximize power transfer over a set of radio frequencies through the primary component carrier by at least setting a center frequency of a pass-band of the at least one radio frequency block to correspond to a first median radio frequency value of the primary component carrier, and maximize power transfer over a set of radio frequencies through the combination of the primary component carrier and the secondary component carrier by at least setting the center frequency of the pass-band of the at least one radio frequency block to correspond to a second median radio frequency value between the primary component carrier and the secondary component carrier.

9. The wireless communication device of claim 6, wherein the baseband processor is further configured to adjust settings of the at least one radio frequency block to maximize a downlink data rate.

10. The wireless communication device of claim 6, wherein the baseband processor determines whether uplink communication is power constrained further based at least in part on whether an uplink transmit power headroom is less than a power headroom threshold value or an uplink transmit power level exceeds a transmit power threshold value.

11. A non-transitory computer readable storage medium having computer program code stored thereon, the computer program code, when executed by one or more processors implemented on a wireless communication device, causes the wireless communication device to perform a method comprising:

determining whether carrier aggregation is enabled;

when carrier aggregation is not enabled, adjusting radio frequency circuitry of a radio frequency front end of the wireless communication device based on default setting values; and when carrier aggregation is enabled:

evaluating radio frequency conditions for a primary component carrier and for a secondary component carrier used for carrier aggregation;

determining whether uplink communication is power constrained;

when uplink communication is power constrained, adjusting the radio frequency circuitry to maximize power transfer over a set of radio frequencies through the primary component carrier; and when uplink communication is not power constrained, adjusting the radio frequency circuitry to maximize power transfer over a set of radio frequencies through a combination of the primary component carrier and the secondary component carrier, wherein the wireless communication device determines whether uplink communication is power constrained based at least in part on whether:

an uplink performance metric is less than an uplink performance threshold and a downlink performance metric is greater than a downlink performance threshold, or a downlink received signal strength exceeds a downlink signal strength threshold and a number of uplink random access channel (RACH) failures occur.

12. The non-transitory computer readable storage medium of claim 11, wherein adjusting the radio frequency circuitry comprises matching a set of radio frequency components to one or more antennas.

13. The non-transitory computer readable storage medium of claim 11, wherein:

adjusting the radio frequency circuitry to maximize power transfer over a set of radio frequencies through the primary component carrier comprises setting a center frequency of a pass-band of the radio frequency circuitry to correspond to a first median radio frequency value of the primary component carrier, and adjusting the radio frequency circuitry to maximize power transfer over a set of radio frequencies through the combination of the primary component carrier and the secondary component carrier comprises setting the center frequency of the pass-band of the radio frequency circuitry to correspond to a second median radio frequency value between the primary component carrier and the secondary component carrier.

14. The non-transitory computer readable storage medium of claim 11, wherein execution of the computer program code further causes the wireless communication device to adjust the radio frequency circuitry to maximize a downlink data rate.

15. The non-transitory computer readable storage medium of claim 11, wherein the wireless communication device determines whether uplink communication is power constrained further based at least in part on whether an uplink transmit power headroom is less than a power headroom threshold value or an uplink transmit power level exceeds a transmit power threshold value.

* * * * *